Dec. 4, 1923.
F. B. CONVERSE
1,476,325
METHOD OF AND APPARATUS FOR MAKING TIRE CASINGS
Filed June 29, 1920   3 Sheets-Sheet 3
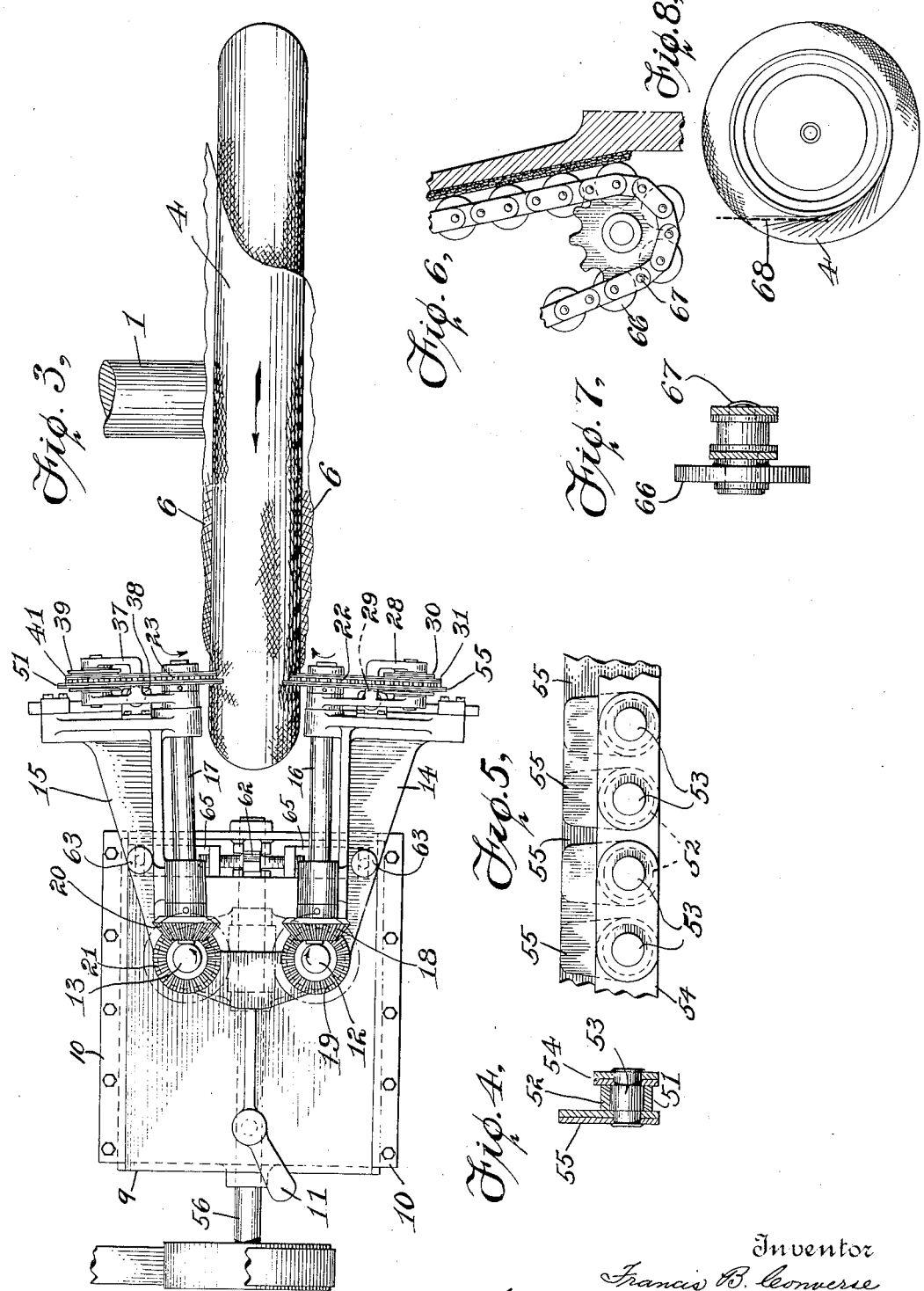

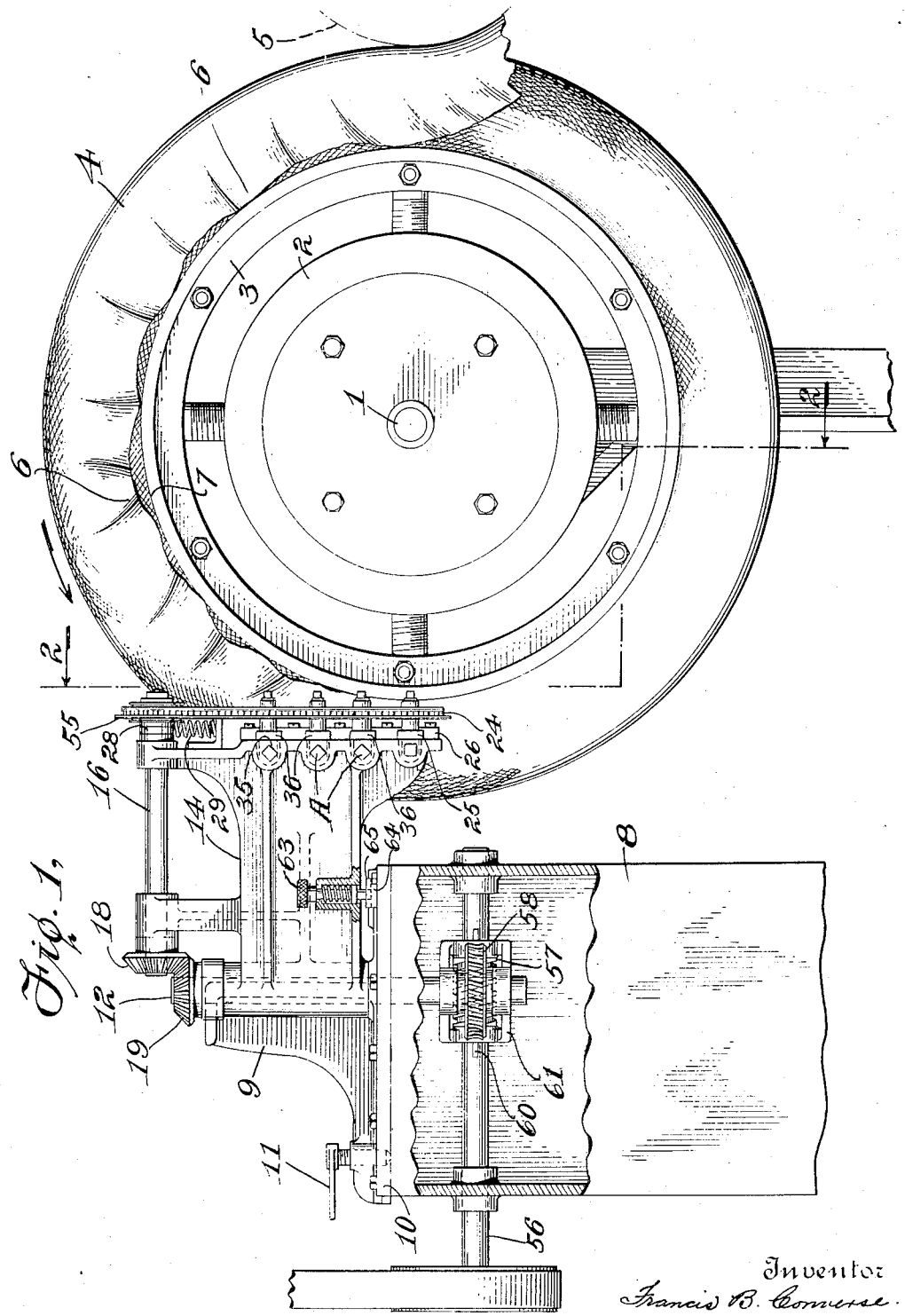

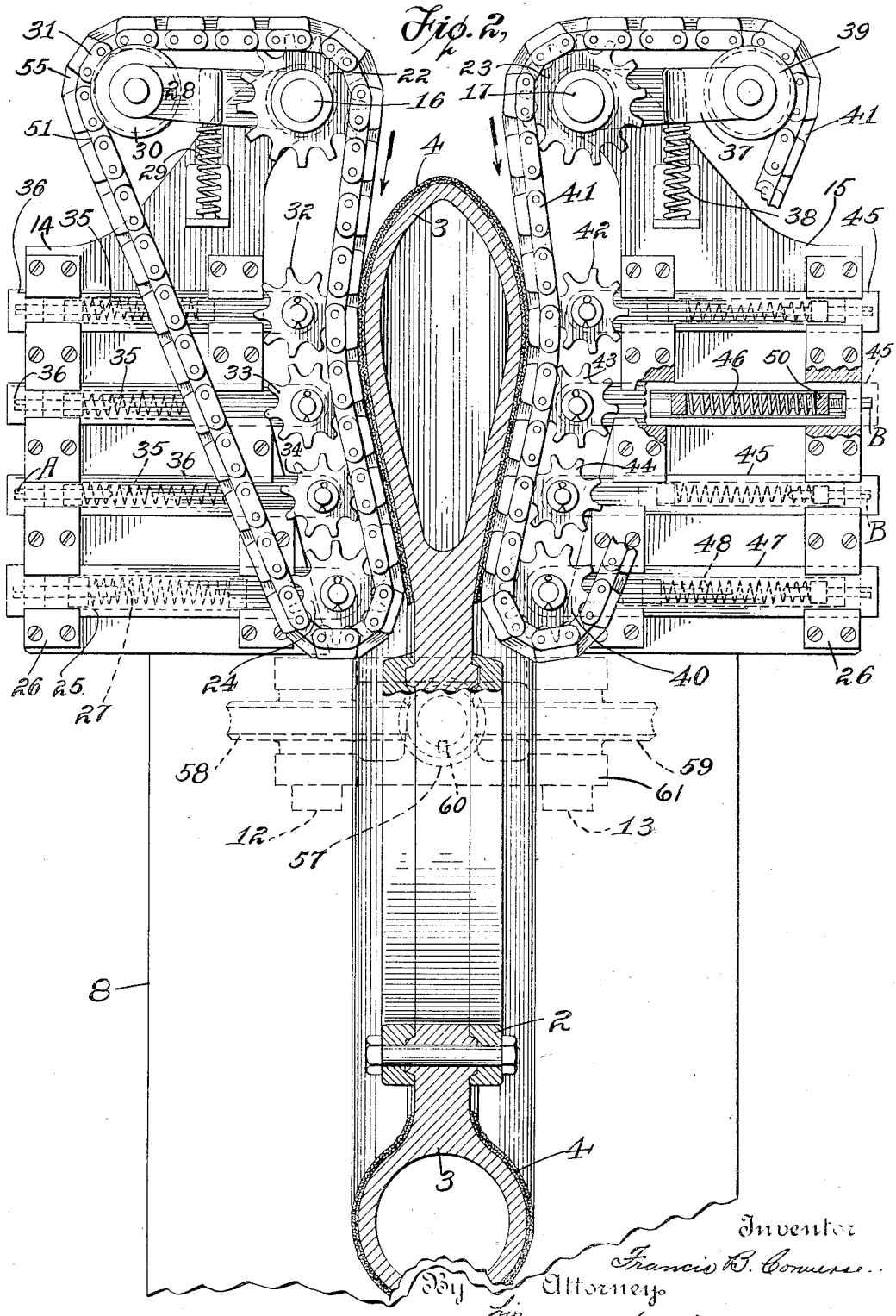

Patented Dec. 4, 1923.

1,476,325

UNITED STATES PATENT OFFICE.

FRANCIS B. CONVERSE, OF NORWALK, CONNECTICUT, ASSIGNOR TO THE NORWALK TIRE AND RUBBER COMPANY, OF NORWALK, CONNECTICUT, A CORPORATION OF CONNECTICUT.

METHOD OF AND APPARATUS FOR MAKING TIRE CASINGS.

Application filed June 29, 1920. Serial No. 392,650.

*To all whom it may concern:*

Be it known that I, FRANCIS B. CONVERSE, a citizen of the United States, and a resident of Norwalk, county of Fairfield, and State of Connecticut, have invented certain new and useful Improvements in Methods of and Apparatus for Making Tire Casings, of which the following is a specification.

My invention relates to a method and apparatus to be employed in the manufacture of tires.

In the manufacture of pneumatic tires as ordinarily practised the central portion of a rubber-coated fabric in a strip of the proper length and width is conformed to a core or former and the edge portions of the strip where a fullness exists is worked in to the core. This process of conforming the edge portion of the fabric is commonly referred to as "stitching." It is necessary in the stitching operation that the fullness of the fabric be uniformly taken up and pressed together without irregularities or wrinkles of any sort so that the sides of the tire may present a smooth and finished appearance. The rubber-coated fabric commonly used is cut in strips on an angle usually of 45° to the length of the fabric as woven so that the warp and the filler threads cross the strip at this same angle, this angularity of the threads of the fabric facilitating stretching of the fabric around the tread portion of the tire (should such stretching be desired) and the gathering of the fullness of the fabric at the sides and bead portion of the tire in the stitching operation.

By my method and apparatus the tire casing is formed by applying the rubber-coated fabric constituting the casing in a stretched (if desired) condition to a core to cause the central portion of the fabric to conform to the rounded outside or tread portion of the core, the sides of the fabric thereafter being "stitched" or worked in place about the sides of the core by applying pressure to the casing at a point adjacent the outer portion thereof and moving the zone of application of the pressure inwardly along a radial line extending from the first zone of application to the center of the core to conform the fabric to the core along a tangential line extending from near the tread to the bead.

A mechanism which may be employed in practising my method comprises in part flexible stitching elements arranged to engage simultaneously the sides of the fabric on opposite sides of the core, these stitching elements being positively driven in a vertical plane substantially at a right angle to the path of travel of the core upon which the fabric is disposed, the stitching elements by reason of their position relatively to the core first engaging the fabric near the outer or tread portion of the core and while maintaining their position on the same radial line moving along that line toward the core center to traverse a radial path from the first point of contact of the stitching elements with the fabric to the bead line of the tire. The result is that the stitching elements function to drag the fabric toward the center of the core thereby stretching the fabric in that direction and gathering in the fullness thereof at the side of the core.

In the accompanying drawings wherein I have shown an embodiment of an apparatus for stitching tire casings in the manner above outlined,—

Fig. 1 is a front elevation showing a tire in the process of formation;

Fig. 2 is a section taken substantially on the line 2—2 of Fig. 1 looking in the direction of the arrows;

Fig. 3 shows the mechanism of Fig. 1 in plan;

Figs. 4 and 5 are details of the stitching element;

Figs. 6 and 7 show a modified form of stitcher; and

Fig. 8 illustrates diagrammatically the action of the modified stitcher of Figs. 6 and 7.

Referring to the drawings in detail, a tire core designated 3 is shown mounted on a chuck 2 which may be of any of the many well-known forms of chucks employed in the tire-making art, this chuck being driven by a drive-shaft 1. The fabric which it is desired to apply to the core 3 is designated 4 and is taken from any suitable source of supply, such as a roll of fabric, being stretched if desired by passing the same through the usual stretching rolls employed in the manufacture of tires, passing from these rolls around a guide-roller indicated diagrammatically at 5 and there applied to the core. The surface of the core is previously cemented with rubber cement or the like to which the fabric will adhere. The fabric in its initial application to the core will conform to the rounded outside portion of the core but the edges of the fabric will gather into folds or ripples 6 as illustrated in Fig. 1.

It is an object of this invention to work the sides of the casing inwardly toward the bead line 7 of the tire so as to eliminate these folds or ripples and to cause the sides of the tire to have a smooth finished condition such as indicated in the lower part of Figs. 1 and 2 for example. To this end, therefore, I have provided a pedestal 8 which if desired may be supported on the same bed-plate as the rest of the machine, this pedestal carrying on its upper face a frame 9 which is slidable under gibs 10 toward and away from the core 3, a set-screw or the like 11 serving to hold the frame 9 in adjusted position. A pair of vertically disposed shafts 12 and 13 have a bearing in the frame 9 and pivotally mounted on these shafts are brackets 14 and 15, a bracket on each shaft. Mounted in bearings on the bracket 14 is a horizontally-extending shaft 16 and a corresponding shaft 17 is mounted in bearings in the bracket 15. Carried at one end of the shaft 16 is a bevelled gear 18 meshing with a bevelled gear 19 carried by the upper end of the shaft 12 and carried on the end of the shaft 17 is a bevelled gear 20 meshing with a bevelled gear 21 carried on the upper end of the vertically-extending shaft 13. The opposite ends of the shafts 16 and 17 support sprockets 22 and 23 respectively. The bracket 14 carries at the lower portion thereof a sprocket 24 mounted on a slide 25 suitably guided in gibs 26 in the bracket, the slide and therefore the sprocket 24 being thrust toward the core 3 by means of a spring 27.

The shaft 16 also carries a pivoted arm 28 yieldingly held in position by a spring 29, this arm carrying an idler roller 30. The sprockets 22 and 24 and the idler roller 30 carry a sprocket-chain 31 constituting a flexible stitching element, the slack of which is always taken up by the arm 28 and spring 29. In addition to the sprockets 22 and 24 I provide also what may be termed idler or guiding sprockets 32, 33 and 34, these sprockets being held in position to cause the sprocket-chain 31 to conform to the shape of the tire by means of springs 35, each sprocket being mounted on an adjustable slide 36 which as just pointed out is held in position by the spring 35. The tension of these springs is adjustable by means of screws A so that the required pressure may be exerted upon the fabric at all times. The mechanism just described is shown at the left of Fig. 2 and a duplicate of this mechanism is shown at the right-hand side of this figure and for the sake of clearness will be described in detail.

Referring therefore to the right-hand side of Fig. 2, it will be observed that I have pivoted on the shaft 17 and arm 37 corresponding to the arm 28, this arm being yieldingly held in position by a spring 38, the outer end of this arm carrying an idler roller 39. At the lower end of the bracket 15 I have provided a sprocket 40 corresponding to the sprocket 24 and this sprocket, together with the sprocket 23 and idler-roller 39 support a flexible stitching element comprising a sprocket-chain 41, the slack of which is taken up by the arm 37 and spring 38 in an obvious manner. The chain 41 is guided by idler-sprockets 42, 43 and 44 each of which is carried at the end of a slide 45 and each of which is yieldingly held in position by a spring 46. The sprocket 40 is also mounted on a slide 47 slidable on the bracket 15, being held in working position by a spring 48. The tension of the springs 46 and 48 and the slides 45 and 47 is adjustable by screws B.

The flexible stitching element or chain 31 at the left-hand side of Fig. 2 is made up of links which I will designate 51 each of which comprises a central roller 52, rivet 53 and side members 54, the members 55 constituting the other side of the stitching element being extended so as to project above or beyond the side members 54. The extended side members 55 are so shaped as to present a practically continuous working edge as will be apparent from Fig. 5.

The flexible stitching element or chain 41 at the right of Fig. 2 is a duplicate of the stitching element just described and will therefore not be referred to in any more detail.

The shafts 16 and 17 are both driven from the same power shaft 56 on which shaft is mounted a worm 57 engaging worm-wheels 58 and 59 mounted on the lower end of the shafts 12 and 13 respectively so that as the worm is rotated the worm-wheels 58 and 59 will impart motion to the shafts 12 and 13 to cause the same to rotate in the direction indicated by the arrows thereon in Fig. 3. This motion or rotation of the shafts 12 and 13 causes the chains 31 and 41 to travel in the direction of the arrows shown on the ends of the shafts in Fig. 3. The worm 57 being splined on the drive-shaft 56 as indicated at 60 may be moved along the shaft 56 by the yoke casting 61 when the frame 9 is adjusted horizontally.

The brackets 14 and 15 and therefore the sprocket-chains 31 and 41 are adjustable relatively to each other and to the core 4 to determine the point of tangency of the chains with the rounded outer portion of the fabric by means of a right and left hand screw designated 62, which adjusts the positions of slides 65—65 on the frame 9; and to effect the adjustment of the brackets 14 and 15 spring-pressed bolts 63 are provided carried by the brackets, these bolts engaging with their lower end notches 64 in the slides 65. The slide 9 is adjusted on the pedestal 8 to bring the chains tangent to the beads of the tire to be made. These are the only adjustments required in changing from one size of tire to another.

For the purpose of applying the beads to the tire or removing the core, etc., the bolts 63 may be withdrawn from engagement with their respective notches in the slides 65 so that the brackets 14 and 15 may be swung entirely away from their working position.

In operation the leading end of the fabric 4 is applied to the core at a point adjacent the roll 5. As the core turns the fabric is thereby stretched to conform the central portion of the fabric to the core. The operator swings the brackets 14 and 15 into contact with the fabric as its leading end reaches the working position of the stitching elements or chains, being careful to avoid contacting the chains with the uncovered part of the core which would scrape therefrom the adhesive coating of cement. This is the position shown in the drawings. The sprockets 32, 33, 34 and 24 at the left of the casing as viewed in Fig. 2 and the sprockets 42, 43, 44 and 40 at the right of the casing as viewed in the same figure conform to the contour of the tire being formed, the springs permitting the sprockets to take the required position. The shaft 56 is set in motion in a direction to cause the shafts 12 and 13 to travel in the direction of the arrows indicated thereon in Fig. 3, at the same time that the core is started, being driven by belt from the same source of power. This motion will be transmitted to the sprocket chains 31 and 41 respectively to cause the same to be driven in the direction of the arrows indicated in Fig. 2. The core 3 with the casing 4 thereon revolves in a counter clock-wise direction as shown in Figs. 1 and 3. The chains 31 and 41 will now travel in a vertical plane substantially at a right angle to the plane of travel of the core; and as the chains engage the fabric on the revolving core they stretch the fabric and stitch the same in a direction toward the center of the core, each link of the chain as it comes in contact with the fabric maintaining its position on the same radial line but moving on that line toward the core center, thereby traversing a path radially from its first point of contact with the casing to the bead line where it leaves the tire. The links of each chain work upon an area very closely behind the area operated upon by the link ahead of it due to the form of link employed and for this reason the fabric is worked or stitched in place along a continuous line that progresses with an uninterrupted motion from near the outer portion of the tire on each side thereof inwardly to the bead line, both sides of the casing being fully covered and the pressure applied thereto in a direction which is most effective to obtain the result desired. The chains are driven slightly faster than the peripheral speed of the core in order not only to avoid any drag on the fabric that is being stitched but also to press it forward toward the portion of the fabric immediately preceding and already stitched in place. It will be seen, therefore, that I have provided a flexible, continuous stitching element as exemplified in these chains whose stitching action is along a continuous, unbroken line and whose flexibility permits it at all times to conform to the varying contour of the tire as it is built up.

In the modification shown in Figs. 6, 7 and 8 I have provided rollers 66 instead of the members 55 of the chains of Fig. 1, these rollers being free to turn upon the pivot 67 of each link of the chains. In using this form of chain the chains are driven at a much higher speed than the peripheral speed of the core, each roll of the chains traversing a nearly straight line tangentially from its first point of contact with the fabric to the bead, this line being indicated by 68 in Fig. 8. The rolls follow each other at short intervals dependent, of course, upon the speed of rotation of the chains and cover the whole surface of the fabric efficiently.

It is to be understood that in the practice of my invention it is not always necessary to stretch the fabric in its initial application to the core, I merely describing the initial stretching of the fabric for purposes of illustration.

It will be apparent from the foregoing that by my improved method and apparatus a tire fabric may be stitched continuously, that is to say, without the necessity of cutting the fabric after each ply has been applied to the core, thereby maintaining a uniformity of stretch throughout the length of the fabric to a much more nearly perfect degree than when each ply is run on to the core as a separate piece.

While I have illustrated and described an apparatus suitable for practising my method it is to be understood that changes may be made therein within the purview of my invention.

What I claim as new is:

1. The method of forming a tire casing which method consists in placing fabric around a core and conforming the fabric to the core by a continuous progressive action along a tangential line extending from near the tread to the bead, all points of said line moving radially of the tire during the rotation of the core.

2. The method of forming a tire casing which method consists in placing fabric around a revolving core and conforming the fabric to the core by a continuous line of pressure moved over the surface of the fabric in the direction of the rotation of the core and radially thereof.

3. In a stitching mechanism for tire machines, the combination of a rotatable core and means for stitching the fabric on said core, said means engaging the side of the casing and travelling with an uninterrupted motion with the core peripherally while traversing a radial path relatively to the core.

4. In a stitching mechanism for tire machines, the combination of a flexible continuous stitching element and means bearing transversely upon the stitching element for holding the same in contact with a fabric constituting a tire casing to stitch the same.

5. In a stitching mechanism for tire machines, the combination of a driven, flexible, continuous stitching element and means bearing transversely upon the stitching element for holding the same in contact with a fabric constituting a tire casing to stitch the same.

6. A stitching mechanism for tire machines comprising a flexible continuous stitching element and means for maintaining the stitching element in contact with the side of a tire casing to stitch the same, the stitching element travelling peripherally in a direction substantially from the crown to the bead of the casing.

7. A stitching mechanism for tire machines comprising a flexible continuous stitching element, means for maintaining the same in contact with a tire casing for stitching the same, and means for positively driving said stitching element in a direction substantially from the crown to the bead of the casing.

8. In a stitching mechanism for tire machines the combination of a rotatable core, a casing thereon and stitching means engaging the side of the casing along a line extending from near the tread to the bead and travelling with the casing peripherally while traversing a radial path thereon.

9. In a stitching mechanism for tire machines the combination of a rotatable core, a casing thereon, stitching means engaging the side of the casing along a line, and means for driving the said stitching means in the direction of the line of contact of the stitching means with the casing.

10. In a stitching mechanism for tire machines the combination of a rotatable core, stitching means for stitching fabric thereon said means engaging the fabric along a line at an angle to the radius of the core, and means for driving said stitching means in the direction of its line of contact with the fabric faster than the peripheral speed of the fabric whereby the fabric is pressed forward and radially toward the center of the core.

11. In a stitching mechanism for tire machines the combination of a rotatable shaft, a bracket pivoted thereon, a shaft carried by said bracket, a flexible, continuous stitching element driven by said shafts, and means for maintaining the stitching apparatus in operative relation to a tire casing to be stitched.

12. In a stitching mechanism for tire machines the combination of a bracket, a rotatable shaft carried thereby, sprockets carried by said bracket, one of which sprockets is mounted on said shaft, a chain driven by said sprockets and guided thereby into operative relation to a tire casing to be stitched.

13. In a stitching mechanism for tire machines the combination of a pivoted bracket, a shaft carried thereby, a sprocket on said shaft, other sprockets yieldingly mounted on said bracket, and a chain adapted to be driven by said sprockets and maintained in operative relation to a casing to be stitched.

14. In a stitching mechanism for tire machines the combination of a sprocket chain the links constituting one side of the chain being extended to project beyond the body of the chain, sprockets for driving said chain and for yieldingly maintaining the extended side of the chain in engagement with a tire casing to stitch the same.

15. In a stitching mechanism for tire machines the combination of a pedestal, a frame carried thereby, brackets on said frame, adjustable slides carried by said brackets, sprockets on said slides, and sprocket chains on said sprockets for stitching a tire casing.

16. In a stitching mechanism for tire machines the combination of a pedestal, a drive shaft having a bearing therein, a worm on said shaft adjustable longitudinally thereof, an adjustable frame on said pedestal, a pair of shafts having a bearing in said frame, worm-wheels carried by said shafts and in mesh with said worm, a pair of brackets pivoted on said frame, sprocket chains for stitching a tire casing mounted on said brackets, and driving connections between said chains and said last-named shafts.

17. In a stitching mechanism for tire machines the combination of a frame adjustable toward and from a tire core, a bracket pivotally mounted relatively to said frame, a stitching element carried by said bracket, yielding slides carried by said bracket, and sprockets carried by said slides for supporting said stitching element.

18. In a stitching mechanism for tire machines a flexible continuous stitching element, and yielding means bearing transversely upon the stitching element for holding the same in contact with a tire casing on a line parallel with the tangent to the bead line of the casing.

19. In a stitching mechanism for tire machines a flexible continuous stitching element, means for holding the same in contact with a tire casing on a line parallel with the tangent to the bead line of the casing, and means for driving said stitching element in a direction substantially from the crown to the bead of the casing.

20. In a stitching mechanism for tire machines a flexible stitching element, and yielding means bearing transversely upon the stitching element for holding the same in contact with a tire casing along a line lying in a plane at a right angle to a core on which the casing is mounted, said contact extending across the zone of the fabric which is to be stitched.

21. In a stitching mechanism for tire machines a flexible stitching element, means for holding the same in contact with a tire casing along a line lying in a plane at a right angle to a core on which the casing is mounted, said contact extending across the zone of the fabric which is to be stitched, and means for driving the stitching element.

22. In a tire stitching machine a driven flexible continuous stitching element provided with a portion for contacting with the fabric of a tire casing, and means for maintaining the stitching element in contact with the fabric along a line lying in a plane at right angle to a core on which the casing is mounted.

23. In a stitching apparatus for tire machines the combination of a flexible stitching element provided with a continuous edge for contacting with the fabric of a tire casing, means for maintaining the same in contact with the fabric along a line extending across a portion of the fabric to be stitched and means for driving said stitching element.

24. In a stitching mechanism for tire machines the combination of a core, fabric thereon, a flexible stitching element provided with a continuous edge maintained in contact with the said fabric along the side of the core, said flexible stitching element travelling peripherally with the core and at the same time traversing the core radially.

25. In combination a flexible element comprising a plurality of stitching rolls, means for maintaining the rolls in contact with a tire casing to be stitched, and means for driving said flexible element in a direction substantially from the crown to the bead of the casing.

26. In combination a flexible element carrying stitching rolls, means for maintaining the same in contact with a tire casing along a line at an angle to the radius of a core upon which the casing is mounted, and means for driving the flexible element in a direction substantially from the crown to the bead of the casing mounted on said core at a higher speed than the peripheral speed of the core.

27. In combination a sprocket chain provided with stitching rolls, spring-pressed sprockets for maintaining the stitching rolls in operative position and a positively driven sprocket for driving said chain.

28. In a tire stitching machine, the combination of a sprocket chain, means for holding the same in contact with a tire to be stitched and means for driving the chain.

29. In a tire stitching machine, a sprocket chain, means for yieldingly holding said chain in contact with the tire to be stitched and means for driving the chain.

30. In a tire stitching machine, the combination of a sprocket chain, means bearing transversely upon said chain for holding the same in contact with a tire to be stitched and means for driving the chain.

31. In a tire stitching machine, a rotatable core, a stitching mechanism composed of a plurality of stitching elements all of which travel successively in a common path across the full width of the fabric to be stitched while traveling peripherally with the core in a direction substantially from the crown to the bead of the casing mounted on said core.

This specification signed this 16th day of June, 1920.

FRANCIS B. CONVERSE.